(12) United States Patent
Hansen

(10) Patent No.: US 6,798,841 B2
(45) Date of Patent: Sep. 28, 2004

(54) PARTIAL RESPONSE MAXIMUM LIKELIHOOD (PRML) DETECTION TRELLIS METHOD ADAPTABLE TO SIGNAL DROPOUTS

(75) Inventor: Douglas C. Hansen, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 740 days.

(21) Appl. No.: 09/742,854

(22) Filed: Dec. 20, 2000

(65) Prior Publication Data

US 2002/0118768 A1 Aug. 29, 2002

(51) Int. Cl.[7] .............................................. H04L 1/00
(52) U.S. Cl. ....................... 375/265; 375/341; 714/792
(58) Field of Search ................................ 375/265, 321, 375/341; 360/46

(56) References Cited

U.S. PATENT DOCUMENTS 5,541,955 A * 7/1996 Jacobsmeyer ............... 375/222
5,841,819 A * 11/1998 Hu et al. .................... 375/341
5,914,988 A * 6/1999 Hu et al. .................... 375/341
5,956,195 A * 9/1999 Brickner et al. .............. 360/65
5,966,262 A * 10/1999 Brickner et al. .............. 360/65

* cited by examiner

Primary Examiner—Stephen Chin
Assistant Examiner—Lawrence Williams
(74) Attorney, Agent, or Firm—Brooks Kushman P.C.

(57) ABSTRACT

An adaptive trellis adaptable to read a signal having signal amplitude dropouts includes a standard partial response maximum likelihood (PRML) trellis and an estimating PRML trellisd. The standard trellis is associated with a standard state diagram having standard branches between states. The estimating trellis is associated with an estimating state diagram having estimating branches between states. Each branch has an associated error metric. Each state of the standard state diagram has two estimating branches feeding into that state and each state of the estimating state diagram has two standard branches feeding into that state. The states are connected by paths formed by branches between the states. A path error metric is the sum of all branch error metrics for all of the branches that form the path. The path arriving at one state having the lowest error metric is the expected path to the next state for reading the signal.

13 Claims, 4 Drawing Sheets

PARTIAL RESPONSE MAXIMUM
LIKELIHOOD (PRML) DETECTION
TRELLIS METHOD ADAPTABLE TO
SIGNAL DROPOUTS

TECHNICAL FIELD

The present invention is generally related to tape and disk storage systems and methods and, more particularly, to the field of partial response maximum likelihood (PRML) detection trellis based channels.

BACKGROUND ART

Traditional peak detection channels in magnetic disk drives have been replaced by partial response maximum likelihood (PRML) read channels to allow for higher recording densities where individual symbols written on the magnetic disk may overlap neighboring bit cells resulting in inter-symbol interference. Each bit decision made by a peak detection read channel is based on the read signal inside that bit cell only. The bit decision is completely independent to the read signal inside neighboring bit cells.

On the other hand, PRML read channels make use of the read signal inside a desired bit cell and neighboring bit cells to decide the content of the desired bit cell. Information from the neighboring bit cells results in improved (lower) bit error rates over conventional peak detection channels in the presence of additive noise. The lower bit error rate of PRML channels is usually traded for higher data densities. The data density is increased until the bit error rate degrades to the lowest acceptable level for a particular product.

PRML read channels use a complicated set of equations to make an optimal bit decision based upon the read signal within the desired bit cell and neighboring bit cells. PRML read channels became practical when Andrew J. Viterbi developed an algorithm that significantly reduced the number of computational steps required to make the optimal bit decision. Viterbi's algorithm is generally called a "trellis" and is represented by a two-dimensional graph of various allowable data patterns.

PRML read channels are relatively immune to additive Gaussian noise. However, PRML read channels are more susceptible than peak detection read channels to most other types of channel degradation such as amplitude loss, misequalization, and timing errors. Therefore, a PRML read channel produces lower bit error rates than a peak detection read channel when additive Gaussian noise is dominant, but higher bit error rates than a peak detection read channel when other types of signal degradation are dominant.

PRML read channels were adopted in disk drives before tape drives because disk drives have more additive Gaussian noise while other types of signal degradation are small. PRML read channels are now being used in tape drives. However, amplitude loss and other types of degradation common in tape signals reduce the potential PRML advantage.

Signal dropouts cause a large majority of most read errors in most tape drives. A signal dropout occurs when the amplitude of the read signal is lower than expected. In a tape drive, signal dropouts occur because of imperfect magnetic coating on the tape and contaminants contained on the tape. Other sources of signal degradation (such as additive noise or distortion) generally cause a much smaller minority of read errors in a tape drive. For a tape drive, the bit error rate of a PRML read channel inside a signal dropout is generally much higher than the bit error rate of a peak detection read channel (depending on the channel architecture and the dropout characteristics). Therefore, one of the greatest obstacles to using PRML read channels in a tape drive is their susceptibility to signal dropouts.

SUMMARY OF THE INVENTION

Accordingly, it is an object of the present invention to provide a partial response maximum likelihood (PRML) detection trellis method adaptable to signal dropouts.

It is another object of the present invention to provide a PRML detection trellis method adaptable to signal dropouts for use with a tape drive.

It is a further object of the present invention to provide a tape drive employing a PRML detection method adaptable to signal dropouts.

In carrying out the above objects and other objects, the present invention provides an adaptive trellis adaptable to read a signal having signal amplitude dropouts. The adaptive trellis includes a standard partial response maximum likelihood (PRML) trellis. The standard trellis is associated with a standard state diagram having standard branches between states. A first set of the standard branches produce a non-zero amplitude read signal sample and a second set of the standard branches produce a zero amplitude read signal sample.

The adaptive trellis further includes an estimating PRML trellis. The estimating trellis is associated with an estimating state diagram having estimating branches between states. The estimating branches produce estimated read signal samples that adapt to the amplitude of the signal.

The adaptive trellis further includes interconnections between the standard trellis and the estimating trellis. The interconnections allow a path to jump between a state of the standard trellis and a state of the estimating trellis as long as an interconnection between the two states is allowed by the standard trellis. A branch to the estimating trellis is not allowed if it is associated with a zero read signal sample in the standard trellis.

The adaptive trellis can also be represented by a single standard trellis with estimating branches added in parallel with the standard branches. The estimating branches are only placed in parallel with standard branches that produce non-zero read signal samples.

Each of the standard branches and the parallel branches have an error metric. The path with the lowest path error metric arriving at the first state is allowed to continue on and connect to the second state. The path error metric is the sum of all error metrics for all preceding branches that comprise the path. In an EPR4ML trellis, the error metric for a standard branch is (the amplitude of the read signal sample—target amplitude of the read signal sample)^2, where the target amplitude of the read signal sample=1.0, 0.5, 0, −0.5, or −1.0, assuming the monopulse peak amplitude is unity. The error metric for a parallel branch is (the amplitude of the read signal sample—target amplitude of the read signal sample*monopulse peak estimated by the path leading to the parallel branch)^2, where the target amplitude of the read signal sample=1.0, 0.5, 0, −0.5, or −1.0.

Further, in carrying out the above object and other objects, the present invention provides an adaptive trellis detection method adaptable to read a signal having signal amplitude dropouts.

The advantages associated with the present invention are numerous. The adaptive PRML detection channel in accordance with the present invention has been shown to have approximately the same dropout performance as conventional peak detection channels and approximately the same noise performance as conventional PRML detection channels in typical tape drive environments.

The above objects and other objects, features, and advantages of the present invention are readily apparent from the following detailed description of the best mode for carrying out the present invention when taken in connection with the accompanying drawings.

BEST MODE FOR CARRYING OUT THE INVENTION

Figure 1:
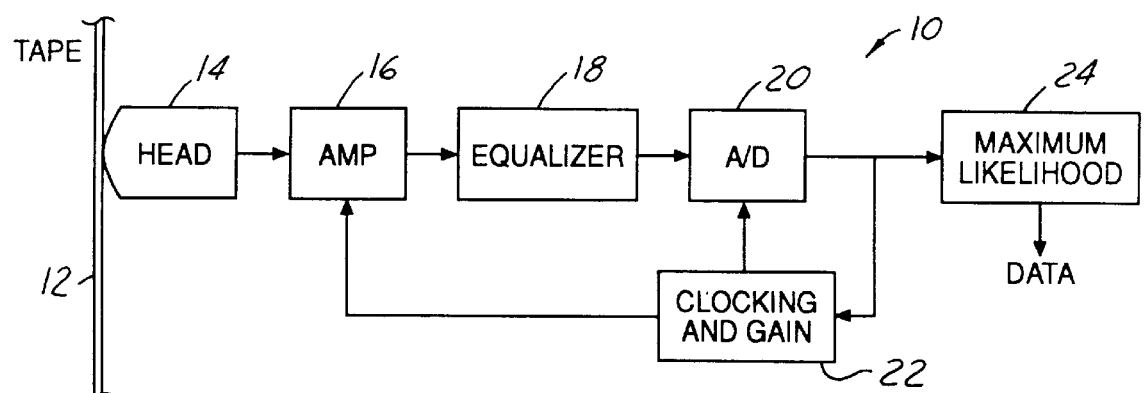
FIG. 1 illustrates a block diagram of a partial response maximum likelihood (PRML) read channel in accordance with the present invention.

Referring now to FIG. 1, a block diagram of a partial response maximum likelihood (PRML) read channel 10 in accordance with the present invention is shown. PRML read channel 10 may be incorporated as part of a tape drive. Magnetic tape 12 stores data. A magnetic head 14 of the tape drive reads the data stored in magnetic tape 12 and converts the data into an analog signal. An amplifier 16 and equalizer 18 amplify and shape the analog signal respectively so that an isolated magnetic flux transition in magnetic tape 12 produces a monopulse 30 as shown in FIG. 2.

Figure 2:
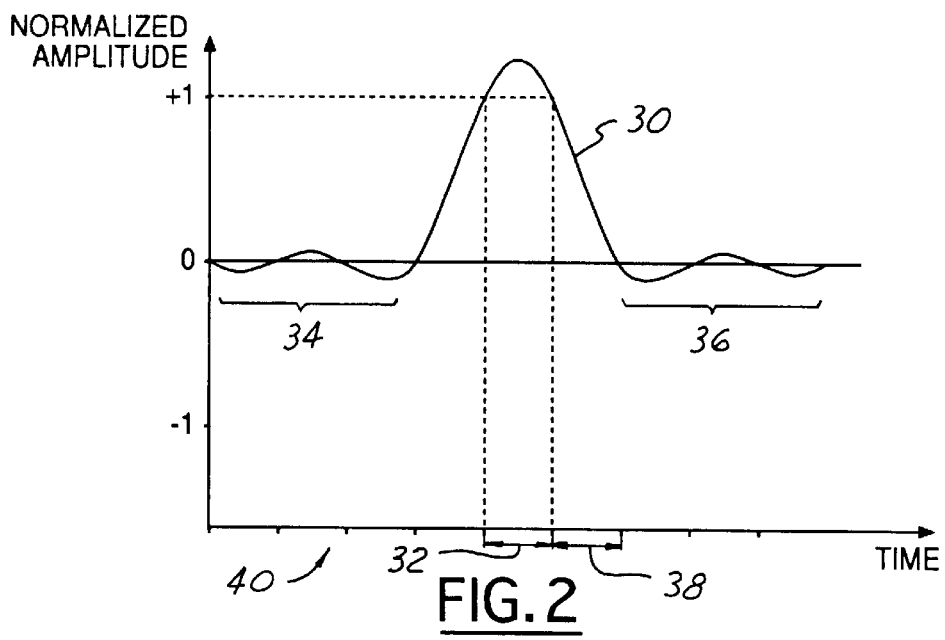
FIG. 2 illustrates a graph of an ideal class IV (PR4) monopulse.

FIG. 2 is a graph of a normalized amplitude of an ideal monopulse 30 as a function of time in a class IV partial response (PR4). In particular, each unit of time shown along the time axis is one bit cell. Bit cells 32 and 38 are pointed out in FIG. 2. The normalized amplitude means that the amplitude of monopulse 30 is unity (+1 or −1) at the start and end of bit cell 32. Tail sections 34 and 36 of monopulse 30 are relatively flat and cross zero amplitude at the start of each bit cell.

Returning to FIG. 1, an analog to digital (A/D) converter 20 converts the amplified and equalized analog signal into the digital domain. The digitized signal provides feedback to a clocking and gain controller 22. Clocking and gain controller 22 adjusts the gain of amplifier 16 to keep the analog signal normalized at the input to A/D converter 20. Triggering of A/D converter 20 is adjusted to sample the normalized and equalized analog signal at the proper times. Finally, the digitized signal is entered into a maximum likelihood detector 24 to determine the most likely data bit value in each bit cell. In an alternative embodiment, triggering of A/D converter 20 may be performed asynchronously at a higher rate, and the sample provided to maximum likelihood detector 24 is interpolated.

If PRML read channel 10 only had to deal with isolated PR4 monopulses then maximum likelihood detector 24 would only have to distinguish between bit cells starting and ending with a unity (+1 or −1) amplitude and those that did not. Any bit cell starting and ending with the unity amplitude represents a magnetic flux transition in magnetic tape 12. All other bit cells represent no flux change in magnetic tape 12.

Figure 3:
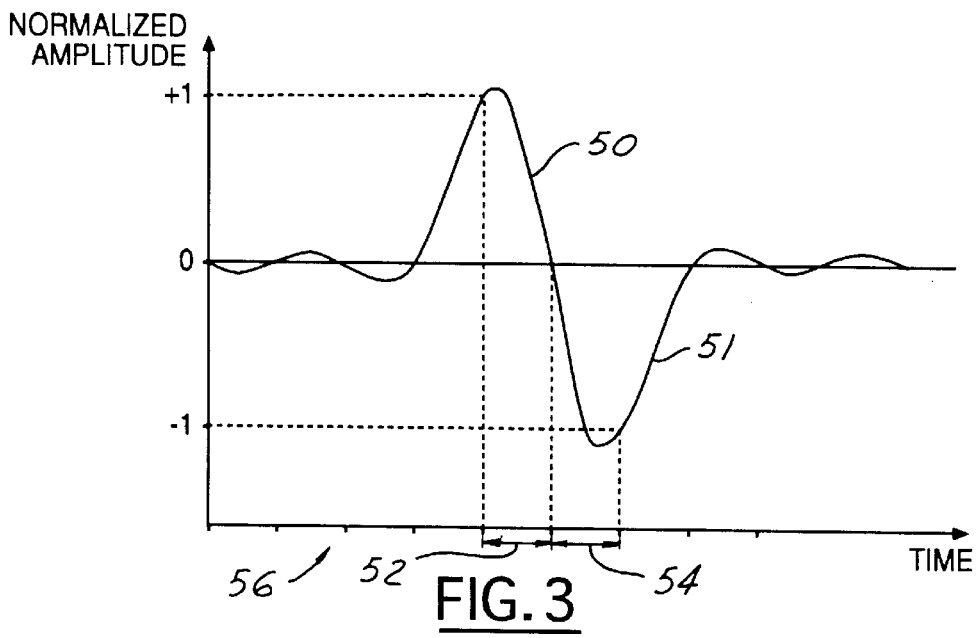
FIG. 3 illustrates a graph of an ideal class IV (PR4) dipulse.

The situation becomes complicated when the data is no longer constrained to isolated monopulses such that a magnetic flux transition in one bit cell follows an opposite magnetic flux transition in adjoining bit cells. As can be seen, monopulse 30 extends beyond one bit cell 32 in time. FIG. 3 illustrates an example of an ideal dipulse signal where a positive amplitude monopulse 50 in one bit cell 52 is immediately followed by a negative amplitude monopulse 51 in an adjoining bit cell 54. The two monopulses 50, 51 interfere in an effect referred to as inter-symbol interference. Note that the normalized amplitude of the dipulse is zero at the end of bit cell 52 and at the start of bit cell 54. Likewise, a pattern of alternating amplitude monopulses can be expanded to three or more adjoining bit cells.

Because of inter-symbol interference, the normalized amplitude of two consecutive samples from A/D converter 20 can have different meanings depending upon earlier samples. For example, two consecutive samples of positive one and then zero normalized amplitude could mean that the bit cell contains the same magnetic flux orientation as the previous cell in the lagging tail 36 of a monopulse 30. See, for example, bit cell 38 in FIG. 2. Likewise, the same positive one and then zero amplitude samples results from bit cell 52 in FIG. 3 where the magnetic flux is of opposite orientation from the previous bit cell. Maximum likelihood detector 24 must be able to distinguish between these two different conditions.

Maximum likelihood detector 24 can be thought of as having a state machine having one state for each possible combination of two consecutive samples. In the case of a PR4 there are four possible states. These four states are caused by north-north (NN), north-south (NS), south-north (SN), and south-south designations are often written as "0" and "1" giving the four states as 00, 01, 10, and 11.

Figure 4:
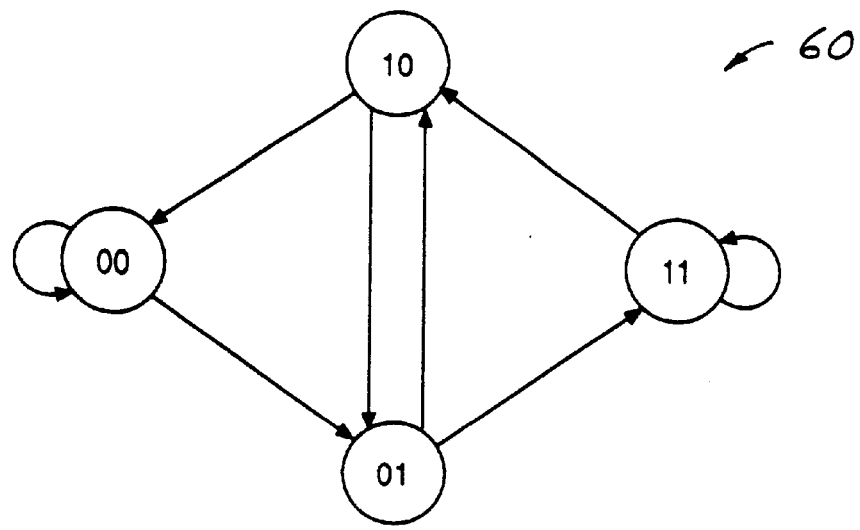
FIG. 4 illustrates a class IV partial response (PR4) state transition diagram of allowable state transitions.

FIG. 4 illustrates a PR4 state diagram 60. Note that not all possible state-to-state transitions are available. For example, there is no direct transition between state 00 and state 11. In another example, state 10 may transition to state 00, but state 00 cannot transition back to state 10. Other classes of PR exist having higher orders of states for larger numbers of consecutive samples. For example, extended partial response 4 (EPR4) uses three consecutive samples to define eight states, and EEPR4 uses four consecutive samples to define sixteen states. Maximum likelihood detector 24 may also be used in other applications such as cellular telephones, satellite communications, wired communications, disk drives, fiber optics, and the like.

Figure 5:
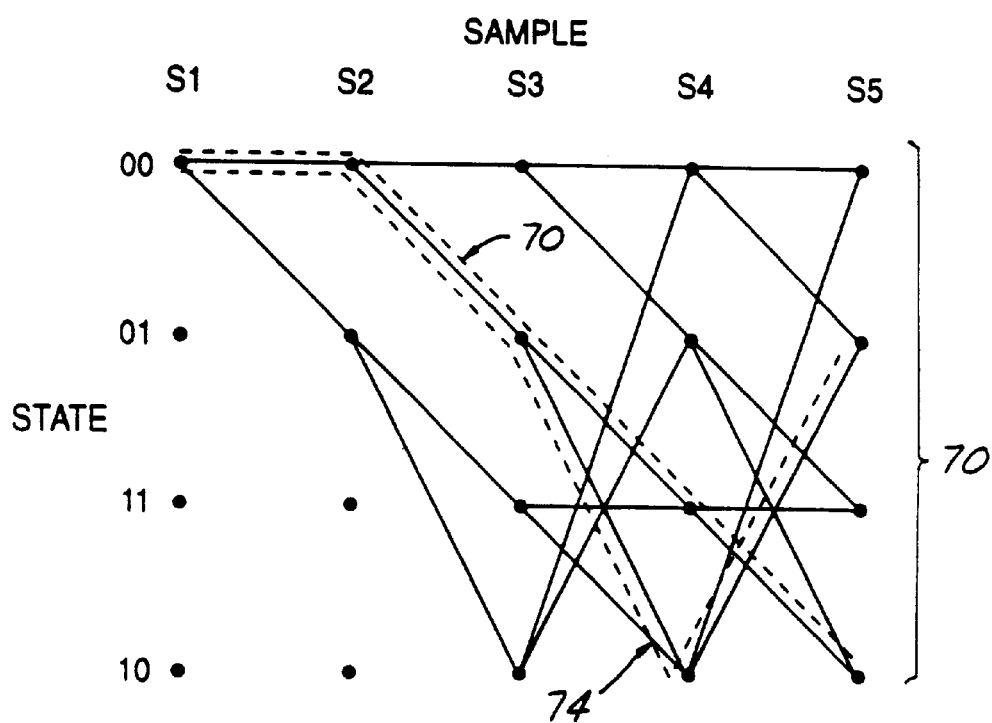
FIG. 5 illustrates a partial trellis diagram of the state transition diagram shown in FIG. 4.

Plotting the state as a function of consecutive samples produces a trellis 70 as shown in FIG. 5. Trellis 70 only shows the allowable transitions assuming sample S1 ends in state 00. As each consecutive sample S2, S3, S4, and S5 are considered, trellis 70 branches out in accordance with the allowable state transitions shown in state diagram 60.

Working with several consecutive samples, maximum likelihood detector 24 calculates the probability along each branch in trellis 70 searching for a most probable path. By this method, the trellis detector can distinguish a positive one and then zero normalized amplitude sequence caused by an isolated monopulse from the same sequence caused by a dipulse. Assuming, for example, that sample S1 was taken at time 40 in FIG. 2, then the target monopulse amplitude samples would follow a sequence of S5=0, S4=1, S3=1, S2=0, and S1=0. In terms of trellis 70, this corresponds to the series of states S5=10, S4=11, S3=01, S2=00, and S1=00 as shown by path 72. In a dipulse, for example, assume that S1 was taken at time 56 shown in FIG. 3. Here the sample sequence is S5=−1, S4=0, S3=1, S2=0, and S1=0. In terms of trellis 70 places the dipulse in states S5=01, S4=10, S3=01, S2=00, and S1=00 as shown by path 74.

Maximum likelihood detector 24 may produce incorrect data as a result of a signal dropout. A signal dropout may cause maximum likelihood detector 24 to read the amplitude of a non-zero signal sample as being less than the expected amplitude of the non-zero signal sample. One of the greatest obstacles to using a PRML read channel in a tape drive is the susceptibility of the PRML read channel to signal dropouts.

Figure 6:
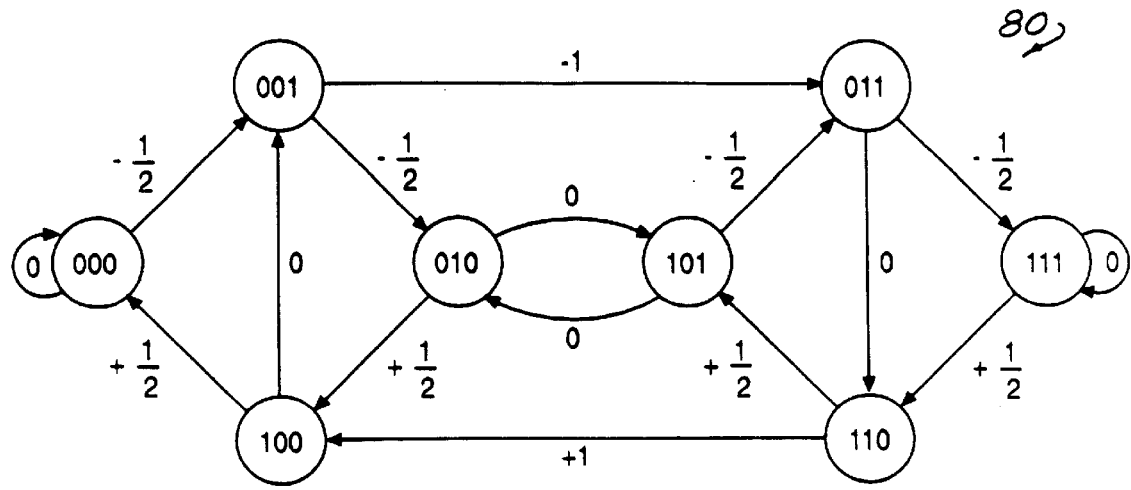
FIG. 6 illustrates an EPR4 state transition diagram of allowable state transitions.

As described above, other classes of PR exist having higher orders of states for larger numbers of consecutive samples. For example, EPR4 uses three consecutive samples to define eight states. FIG. 6 illustrates an EPR4 state diagram 80. EPR4 involves the current sample, the preceeding sample, and the proceeding sample. There are eight possible states: 000, 001, 010, 011, 100, 101, 110, and 111. The states are connected by branches showing the allowable state transitions. For each branch, EPR4 state diagram 80 lists the normalized EPR4ML target read signal samples (trellis voltages) associated with state-to-state transitions, i.e., the branches. These voltages are +1, +0.5, 0,−0.5, and −1.

Figure 7:
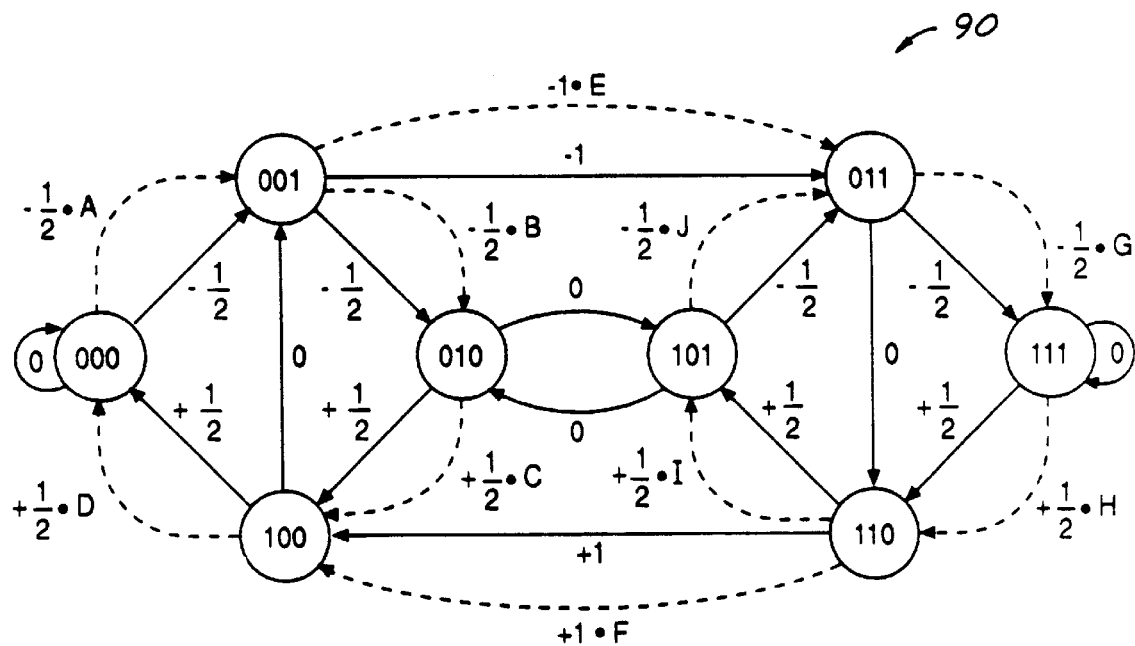
FIG. 7 illustrates a state diagram representation of an EPR4ML adaptive trellis in accordance with the present invention.

Referring now to FIG. 7, a state diagram representation of an EPR4ML adaptive trellis 90 in accordance with the present invention. Adaptive trellis 90 includes a standard EPR4ML trellis and an estimating EPR4ML trellis. The solid lines represent standard branches that terminate on a state of the standard trellis. The dotted lines represent adaptive branches that terminate on a state of the estimating trellis. A total of eight states must be maintained in the standard trellis. A total of sixteen states—or possibly two forms each of eight states—must be maintained in adaptive trellis 90. In effect, adaptive trellis 90 includes new estimating or adaptive branches which have been added in parallel with every standard branch that produces a non-zero read signal sample. These new parallel estimating branches have target or estimated amplitude read signal samples that adapt to the read signal amplitude in real time.

Standard branches with read signal samples equal to zero do not produce errors inside signal dropouts. A read signal sample of zero is still zero inside a dropout so a standard branch with a read signal sample of zero will function correctly inside and outside of dropouts. However, standard branches with non-zero read signal samples do produce errors inside dropouts. Adaptive branches are only needed in parallel with these standard branches. The adaptive parallel branch will be the preferred lower error metric branch and the standard branches are less likely to have low error metrics and be part of the surviving paths as signal amplitude decreases inside a dropout.

Each trellis path in adaptive trellis 90 has two associated metrics: 1) the accumulated total error metric, and 2) the current (real time) estimate of the monopulse peak amplitude based on the preceding signal sample values. Each path makes its own independent estimate of the signal amplitude. (A standard trellis only uses the first metric and always assumes that the normalized monopulse amplitude is unity.) So when a path follows a dotted line branch, the error metric is calculated with a target value that is based on an estimate of the current monopulse peak voltage.

All of the standard Viterbi rules regarding the survival of the lowest error metric path arriving at each node are used in adaptive trellis 90. The path with the lowest error metric arriving at the first state is allowed to continue on and connect to the second state. The path error metric is the sum of error metrics for all preceding branches that comprise the path. The equations that define adaptive trellis 90 are as follows:

1) the error metric for a standard branch, assuming the monopulse peak is unity is:

(sample voltage−target voltage)^2, where target voltage=+1, +0.5, 0, −0.5, −1;

2) the error metric for a parallel adaptive branch is:

(sample voltage−target voltage*monopulse peak estimated by path leading to this branch)^2, where target voltage=+1, +0.5, 0, −0.5, −1;

3) the algorithm each path uses to estimate signal amplitude is not critical. An example of an algorithm that may be used with adaptive trellis 90 is:

new path estimate of signal amplitude (⅞*old path estimate of signal amplitude)+(⅛*K*most recent sample voltage), where K=−2 if current branch expects a sample voltage of −0.5, K=−1 if current branch expects a sample voltage of −1.0, K=+1 if current branch expects a sample voltage of +1.0, and K=+2 if current branch expects a sample voltage of +0.5.

The signal amplitude estimate is not updated when a path passes through a branch that expects a zero sample voltage.

As shown on FIG. 7, A through J are the estimates of peak signal voltages of paths ending at the arrow tails. For example, A=the best estimate of the monopulse peak, based on the samples incorporated into the path surviving path (the path with the lowest error metric) ending at state 000;

| | |
|---|---|
| B = " | " ending at state 001; |
| C = " | " ending at state 010; |
| D = " | " ending at state 100; |
| F = " | " ending at state 110; |
| G = " | " ending at state 011; |
| H = " | " ending at state 111; |
| I = " | " ending at state 110; and |
| J = " | " ending at state 101. |

For example, if the path ending at state 101 implied a normalized monopulse peak voltage of 0.82, then the solid line (i.e., standard branch) error metric leading to state 011 would be defined by this equation: (signal voltage+0.5)^2. The dotted line (i.e., adaptive branch) error metric leading to state 011 from state 101 would be defined by this equation: (signal voltage+0.41)^2.

In effect, the trellis standard branches that produce zero signal sample voltages are not affected by signal dropouts because a dropout will leave those signal samples with zero voltage. As a result, an alternate branch in parallel with the standard branches producing zero sample voltages is not needed. However, all standard branches that produce non-zero signal sample voltages have been provided in adaptive trellis 90 with an alternate parallel branch. These parallel branches are adaptive because each incorporates an estimate of the real-time monopulse peak into its error metric equation. Thus, in a deep signal dropout in which the adaptive branches have correctly estimated the monopulse peak voltage, the dotted line adaptive branches will produce low error metrics along the correct data path while the traditionally calculated standard branches produce high error metrics and do not survive.

Figure 8:
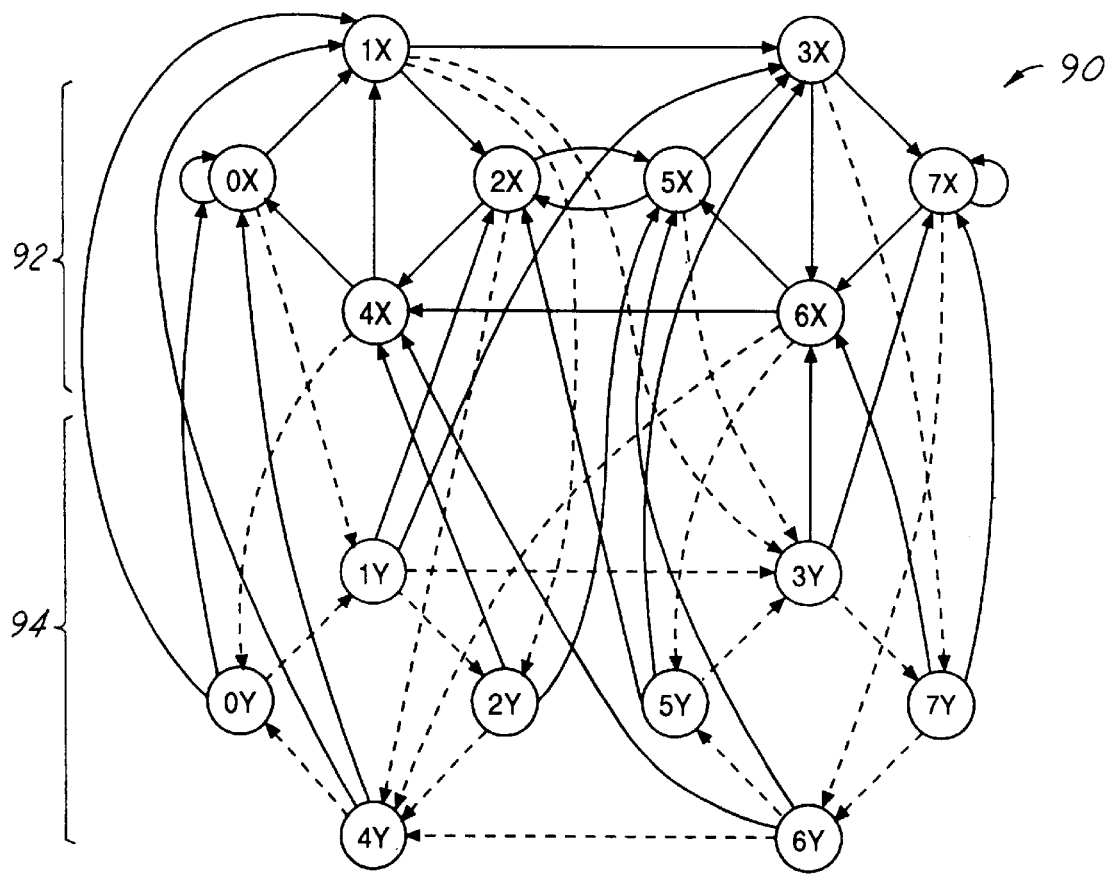
FIG. 8 illustrates a different type of state diagram representation of the same EPR4ML adaptive trellis in accordance with the present invention.

Referring now to FIG. 8, a different type of state diagram representation of EPR4ML adaptive trellis 90 in accordance with the present invention is shown. The alternate representation of adaptive trellis 90 illustrates standard trellis 92 and estimating trellis 94 separated from one another. In contrast, FIG. 7 illustrates estimating trellis 94 overlaid on standard trellis 92.

Standard trellis 92 and estimating trellis 94 are interconnected. The interconnections allow a path to jump between a state of standard trellis 92 and a state of estimating trellis 94 as long as an interconnection between the two states is allowed by the standard trellis. A branch to estimating trellis 94 is not allowed if it is associated with a zero read signal sample in standard trellis 92. As shown in FIG. 8, it is noted that each state of the standard state diagram has two standard branches feeding into that state and that each state of the estimating state diagram has two estimating branches feeding into that state.

Notice that by adding estimating trellis 94 to standard trellis 92, the number of states has doubled (from eight to sixteen). This would normally multiply the total number of branches that must be considered by a factor of four (because the number of states is doubled and the number of allowable states preceding each state is also doubled). However, the number of branches that must be considered in the adaptive trellis is well under this number because the adaptive branches that produce zero sample values have been eliminated.

It is to be noted that standard trellis 92 is not necessarily needed to be incorporated into adaptive trellis 90. Adaptive trellis 90 may function only with estimating trellis 94. If adaptive trellis 90 only contains estimating trellis 94 the branches that produce zero samples need to be added back into the estimating trellis. This is because without standard trellis 90 the standard branches are no longer available for the path to take when the signal is zero.

Generally, standard trellis 92 is desired because if the estimating algorithm is less than perfect, then estimating trellis 94 will produce higher error rates than a standard trellis when the signal amplitude is nominal. Put another way, adaptive trellis 90 incorporates standard trellis 92 with estimating trellis 94 because there is noise in the path estimates of the monopulse peak voltage. The noise is virtually inevitable. Thus, the adaptive branches should produce larger error metrics than the standard branches when the signal amplitude is nominal.

In summary, the present invention provides a PRML detection trellis method adaptable to signal dropouts. One typical implementation of the adaptable trellis required approximately 2.5 times as many gates (computations) than a conventional PRML detection trellis. The adaptive trellis has been shown to produce bit error rates inside deep signal dropouts that are 100–1000 times lower than the bit error rates of standard PRML trellises.

Table 1 lists all of the states and the permissible state transitions for an EPR4ML adaptive trellis in accordance with the present invention. Table 2 lists the non-return to zero (NRZ) sample sequences associated with each state. Table 3 lists the normalized EPR4ML trellis voltages associated with state-to-state transitions. Other values may be used in alternative embodiments.

TABLE 1

Table of Allowable Branch Connections

| State may be preceded by: | State | Comments |
|---|---|---|
| 0X | 0X | a, c |
|  | 4X | a |
|  | 0Y | a, c |
|  | 4Y | a |
| 1X | 0X | a |
|  | 4X | a, c |
|  | 0Y | a |
|  | 4Y | a, c |
| 2X | 1X | a, d |
|  | 5X | a, c, d |
|  | 1Y | a, d |
|  | 5Y | a, c, d |
| 3X | 1X | a |
|  | 5X | a, d |
|  | 1Y | a |
|  | 5Y | a, d |
| 4X | 2X | a, d |
|  | 6X | a |
|  | 2Y | a, d |
|  | 6Y | a |
| 5X | 2X | a, c, d |
|  | 6X | a, d |
|  | 2Y | a, c, d |
|  | 6Y | a, d |
| 6X | 3X | a, c |
|  | 7X | a |
|  | 3Y | a, c |
|  | 7Y | a |
| 7X | 3X | a |
|  | 7X | a, c |
|  | 3Y | a |
|  | 7Y | a, c |
| 0Y | 4X | b |
|  | 4Y | b |
| 1Y | 0X | b |
|  | 0Y | b |
| 2Y | 1X | b, d |
|  | 1Y | b, d |
| 3Y | 1X | b |
|  | 5X | b, d |
|  | 1Y | b |
|  | 5Y | b, d |
| 4Y | 2X | b, d |
|  | 6X | b |
|  | 2Y | b, d |
|  | 6Y | b |
| 5Y | 6X | b, d |
|  | 6Y | b, d |
| 6Y | 7X | b |
|  | 7Y | b |
| 7Y | 3X | b |
|  | 3Y | b |

Comments:
a: This is a standard branch. Use the standard error metric equation for this branch (the expected sample is assumed to be the ideal value.)
b: This is an adaptive branch. Use the adaptive error metric equation for this branch (the expected sample is assumed to be the ideal value multiplied by the ratio of the estimated signal amplitude to the nominal signal amplitude.)
c: These branches have an expected sample value of zero. Do not update a path's estimated signal amplitude when it crosses these branches.
d: States 2 and 5 are eliminated when the trellis is designed for a d=1 code.
f: Adaptive branches that produce an expected zero sample serve no purpose and have been eliminated.

TABLE 2

Explanation of EPR4ML states

| State | NRZ Sequence (earlier --- later bit) |
|---|---|
| 0 | 000 |
| 1 | 001 |
| 2 | 010 |
| 3 | 011 |
| 4 | 100 |
| 5 | 101 |
| 6 | 110 |
| 7 | 111 |

TABLE 3

Expected Sample Voltages for Standard (non-Adaptive) EPR4ML Branches

| First State | Second State | Sample Voltage |
|---|---|---|
| 0 | 0 | 0.0 |
| 0 | 1 | 0.5 |
| 1 | 2 | 0.5 |
| 1 | 3 | 1.0 |
| 2 | 4 | −0.5 |
| 2 | 5 | 0.0 |
| 3 | 6 | 0.0 |
| 3 | 7 | 0.5 |
| 4 | 0 | −0.5 |
| 4 | 1 | 0.0 |
| 5 | 2 | 0.0 |
| 5 | 3 | 0.5 |
| 6 | 4 | −1.0 |
| 6 | 5 | −0.5 |
| 7 | 6 | −0.5 |
| 7 | 7 | 0.0 |

(These values are based on the assumption that the nominal monopulse peak voltage is unity.)

For the expected sample voltages for the adaptive EPR4ML branches the same values listed in Table 3 are used. However, these values must be multiplied by the ratio of the estimated signal amplitude to the nominal signal amplitude.

Thus it is apparent that there has been provided, in accordance with the present invention, a PRML detection trellis method adaptable to signal dropouts that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An adaptive trellis adaptable to read a signal having signal amplitude dropouts, the adaptive trellis comprising:

a standard partial response maximum likelihood (PRML) trellis, the standard PRML trellis associated with a standard state diagram having standard branches between states, wherein a first set of the standard branches produce a non-zero amplitude read signal sample and a second set of the standard branches produce a zero amplitude read signal sample, wherein each state of the standard state diagram has two standard branches feeding into that state, wherein each standard branch has an associated error metric; and an estimating partial response maximum likelihood (PRML) trellis, the estimating PRML trellis associated with an estimating state diagram having estimating branches between states, the estimating branches produce estimated read signal samples that adapt to the amplitude of the signal, wherein each state of the estimating state diagram has two estimating branches feeding into that state, wherein each estimating branch has an associated error metric;

wherein each state of the standard state diagram has two estimating branches feeding into that state;

wherein each state of the estimating state diagram has two standard branches feeding into that state;

wherein the states are connected by paths formed by branches between the states, wherein a path error metric is the sum of all branch error metrics for all of the branches that form the path, wherein the path arriving at one state having the lowest path error metric survives to be identified as the expected path to the next state for reading the signal.

2. The adaptive trellis of claim 1 wherein:

the estimating branches produce estimated read signal samples that adapt to the amplitude of the signal in real time.

3. The adaptive trellis of claim 1 wherein:

each of the standard PRML trellis and the estimating PRML trellis is an EPR4ML trellis.

4. The adaptive trellis of claim 1 wherein the error metric for a standard branch is:

(the amplitude of the read signal sample−target amplitude of the read signal sample)^2, where the target amplitude of the read signal sample=1.0, 0.5, 0, −0.5, or −1.0, assuming monopluse peak amplitude is unity.

5. The adaptive trellis of claim 1 wherein the error metric for an estimating branch is:

(the amplitude of the read signal sample−target amplitude of the read signal sample*monopulse peak estimated by the path leading to the parallel branch)^2, where the target amplitude of the read signal sample=1.0, 0.5, 0, −0.5, or −1.0.

6. A tape drive having a maximum likelihood detector comprising:

an adaptive trellis adaptable to read a signal having signal amplitude dropouts, t he adaptive trellis including a standard partial response maximum likelihood (PRML) trellis, the standard PRML trellis associated with a standard state diagram having standard branches between states, wherein a first set of the standard branches produce a non-zero amplitude read signal sample and a second set of the standard branches produce a zero amplitude read signal sample, wherein each state of the standard state diagram has two standard branches feeding into that state, wherein each standard branch has an associated error metric;

the adaptive trellis further including an estimating partial response maximum likelihood (PRML) trellis, the estimating PRML trellis associated with an estimating state diagram having estimating branches between states, the estimating branches produce estimated read signal samples that adapt to the amplitude of the signal, wherein each state of the estimating state diagram has two estimating branches feeding into that state, wherein each estimating branch has an associated error metric;

wherein each state of the standard state diagram has two estimating branches feeding into that state;

wherein each state of the estimating state diagram has two standard branches feeding into that state;

wherein the states are connected by paths formed by branches between the states, wherein a path error metric is the sum of all branch error metrics for all of the preceding branches that form the path, wherein the path arriving at one state having the lowest path error metric survives to be identified as the expected path to the next state for reading the signal.

7. The tape drive of claim 6 wherein:

each of the standard PRML trellis and the estimating PRML trellis is an EPR4ML trellis.

8. An adaptive trellis detection method adaptable to read a signal having signal amplitude dropouts, the adaptive trellis detection method comprising:

providing a standard partial response maximum likelihood (PRML) trellis;

associating the standard PRML trellis with a standard state diagram having standard branches between states, wherein a first set of the standard branches produce a non-zero amplitude read signal sample and a second set of the standard branches produce a zero amplitude read signal sample, wherein each state of the standard state diagram has two standard branches feeding into that state, wherein each standard branch has an associated error metric; and;

providing an estimating partial response maximum likelihood (PRML) trellis;

associating the estimating PRML trellis with an estimating state diagram having estimating branches between states, wherein the estimating branches produce estimated read signal samples that adapt to the amplitude of the signal, wherein each state of the estimating state diagram has two estimating branches feeding into that state, wherein each estimating branch has an associated error metric;

wherein each state of the standard state diagram has two estimating branches feeding into that state;

wherein each state of the estimating state diagram has two standard branches feeding into that state;

connecting the states by paths formed by branches between the states, wherein a path error metric is the sum of all branch error metrics for all of the branches that form the path; and identifying a path arriving at one state having a lowest path error metric as the expected path to the next state for reading the signal.

9. The adaptable trellis detection method of claim 8 wherein:

the estimating branches produce estimated read signal samples that adapt to the amplitude of the signal in real time.

10. The adaptive trellis detection method of claim 8 wherein:

each of the standard PRML trellis and the estimating PRML trellis is an EPR4ML trellis.

11. The adaptive trellis detection method of claim 8 wherein the error metric for a standard branch is:

(the amplitude of the read signal sample−target amplitude of the read signal sample)^2, where the target amplitude of the read signal sample=1.0, 0.5, 0,−0.5, or−1.0, assuming monopulse peak amplitude is unity.

12. The adaptive trellis detection method of claim 8 wherein the error metric for an estimating branch is:

(the amplitude of the read signal sample—target amplitude of the read signal sample*monopulse peak estimated by the path leading to the parallel branch)^2, where the target amplitude of the read signal sample= 1.0, 0.5, 0, −0.5, or −1.0.

13. An adaptive trellis adaptable to read a signal having signal amplitude dropouts, the adaptive trellis comprising:

an estimating partial response maximum likelihood (PRML) trellis, the estimating PRML trellis associated with an estimating state diagram having estimating branches between states, the estimating branches produce estimated read signal samples that adapt to the amplitude of the signal, wherein each state of the estimating state diagram has two estimating branches feeding into that state, wherein each estimating branch has an associated error metric, wherein each state of the estimating state diagram has two standard branches feeding into that state;

wherein the states are connected by paths formed by branches between the states, wherein a path error metric is the sum of all branch error metrics for all of the preceding branches that form the path, wherein the path arriving at one state having the lowest path error metric survives to be identified as the expected path to the next state for reading the signal.

\* \* \* \* \*